(12) United States Patent
Veprinsky et al.

(10) Patent No.: US 7,430,589 B2
(45) Date of Patent: *Sep. 30, 2008

(54) REMOTE DATA FACILITY OVER AN IP NETWORK

(75) Inventors: Alex Veprinsky, Brookline, MA (US); David Meiri, Boston, MA (US); Ramprasad Shetty, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/224,408

(22) Filed: Sep. 12, 2005

(65) Prior Publication Data

US 2006/0031485 A1 Feb. 9, 2006

Related U.S. Application Data

(63) Continuation of application No. 09/995,464, filed on Nov. 28, 2001, now Pat. No. 6,968,369.

(60) Provisional application No. 60/325,658, filed on Sep. 27, 2001.

(51) Int. Cl.
*G06F 15/16* (2006.01)

(52) U.S. Cl. .................... 709/219; 709/232; 709/250

(58) Field of Classification Search .................. 709/219, 709/232, 250
See application file for complete search history.

(56) References Cited

U.S. PATENT DOCUMENTS

| | | | |
|---|---|---|---|
| 5,537,533 A | 7/1996 | Staheli et al. | |
| 5,742,792 A | 4/1998 | Yanai et al. | |
| 5,901,327 A | 5/1999 | Ofek | |
| 6,173,377 B1 | 1/2001 | Yanai et al. | |
| 6,324,654 B1 * | 11/2001 | Wahl et al. | 714/6 |
| 6,624,388 B1 | 9/2003 | Blankenship et al. | |
| 6,658,469 B1 * | 12/2003 | Massa et al. | 709/224 |
| 6,938,122 B2 | 8/2005 | Meiri et al. | |
| 6,968,369 B2 * | 11/2005 | Veprinsky et al. | 709/219 |
| 2003/0014523 A1 * | 1/2003 | Teloh et al. | 709/226 |
| 2005/0027892 A1 * | 2/2005 | McCabe et al. | 709/253 |

FOREIGN PATENT DOCUMENTS

WO  WO 0135244  5/2001

OTHER PUBLICATIONS

Ziya et al., "Method and Apparatus for Asynchronous Mirroring Using TCP/IP Internet Protocol," Jan. 19, 2001, U.S. Appl. No. 60/262,705.*

Rodney Van Meter, Steve Hotz and Gregory G. Finn, "Task Force on Network Storage Architecture: Internet-attached storage devices," © 1996 IEEE, published in the Proceedings of the Hawaii Int. Conf. On System Sciences, Jan. 8-10, 1997, Wailea, HI.

(Continued)

*Primary Examiner*—John Follansbee
*Assistant Examiner*—Nghi V Tran
(74) *Attorney, Agent, or Firm*—Daly, Crowley, Mofford & Durkee, LLP (57) ABSTRACT

A data storage system capable of performing remote data services (e.g., data mirroring) over an IP network using native connections to the IP network is described. The data storage system employs an architecture that manages the remote data services and the native connections to the IP network in a way that isolates the remote data services application software from the TCP/IP and lower level network processing.

18 Claims, 6 Drawing Sheets

OTHER PUBLICATIONS

European Search Report of Application EP 02 02 1471 mailed Jan. 29, 2003.

"Architecture and Standards for IP Storage Networking," CNT, Jun. 2001.

"EMC/CNT Solution is First to Leverage Fibre Channel Over IP", CNT News, cnt.com/new/press_release, Networld+Interop 2001, Las Vegas, May 8, 2001.

* cited by examiner

REMOTE DATA FACILITY OVER AN IP NETWORK

CROSS REFERENCE TO RELATED APPLICATIONS

This application is a Continuation Application of and hereby claims priority under 35 U.S.C. §120 to U.S. patent application Ser. No. 09/995,464 filed on Nov. 28, 2001, now U.S. Pat. No. 6,968,369, which claims the benefit of U.S. Provisional Application No. 60/325,658 filed Sept. 27, 2001 under 35 U.S.C. §119(e), which applications are hereby incorporated herein by reference in their entirety.

BACKGROUND

The invention relates generally to data storage systems, and in particular, to data storage systems with remote data mirroring capability.

Given the importance of the availability of information, several techniques have been developed for providing enhanced reliability and availability of data stored in a data storage system. Once such technique is remote data mirroring. In a "mirrored" system, the data stored on one data storage system is replicated on another data storage system, preferably at a geographically remote site. Thus, if one or more storage devices on one of the data storage systems fails, or a catastrophic system failure should occur, the data is readily available in the form of a mirrored copy from the remote data storage system.

Devices on a data storage system (or source) that are mirrored on the same remote, data storage system (or target) are referred to as a device group. Likewise, devices on the target that serve or mirror devices on the same source are referred to as a device group. Device groups are used, for example, to insure the consistency of blocks of data too large to be stored in a single area, during planned or unplanned interruptions such as link failures or planned back-ups. Device groups typically span a number of physical and logical volumes, and, in some instances, as when data striping is used, several device groups may be mapped to different portions of a physical or logical volume.

Typically, in a remote data mirroring environment, the source and target device groups are arranged as pairs on any two systems and the source/target device group pairs are connected by dedicated data links (e.g., ESCON links) or switched data links (e.g., switched Fibre Channel links). The data links support writes during data backup operations and reads during data recovery operations.

Such point-to-point and switched data link topologies have distance limitations. To negotiate long distances, the ESCON (or Fibre Channel) data links (connected to data ports of the data storage systems, local and remote) are coupled via a leased line (such as T3) or an IP network. There are significant drawbacks associated with these types of long distance solutions, however. For example, the T3 link is extremely expensive and very slow compared to the ESCON or Fibre Channel links. In addition, because connections using these solutions span diverse network protocols and interfaces, some type of adapter box must be used to translate between diverse protocols and interfaces of, say, ESCON and T3, or ESCON and IP. Typically, the adapter box is designed, configured and managed by some entity other than the data storage system supplier. This means that some aspects of the data storage system's performance are either dictated by the adapter box (for example, delays due to the buffer constraints or encapsulation, availability of IP services), or the quality of the IP line, for example, an IP connection provided by an Internet Service Provider, and are therefore not within the control of the data storage system supplier. Moreover, the design of the adapter boxes, in particular, those supporting FC-to-IP services, can be quite complex, making networks of remotely-connected data storage systems that employ such boxes expensive from a field service perspective.

SUMMARY

In one aspect, the invention provides methods and apparatus, including computer program products, for operating a data storage system in a remote data mirroring arrangement of data storage systems. The methods include determining that storage traffic is to be transferred between the data storage system and a remote data storage system to which the data storage system is coupled by an IP network and enabling transfer of the storage traffic between the data storage system and the remote data storage system over the IP network using a native connection to the IP network.

Particular implementations of the invention may provide one or more of the following advantages.

The present invention allows data storage systems in a remote, data mirrored configuration to participate directly as members of and use the full set of services of an IP network. Allowing the data storage systems to establish native connections to an IP network directly eliminates the need for expensive third-party adapter boxes, which limit the extent to which the data storage systems can use the services of an IP network. Moreover, because the adapter boxes are eliminated, a data storage system supplier is able to better control and monitor performance of remote data service functions that use an IP network (such as the Internet) for long distance transfer of storage traffic.

Other features and advantages of the invention will be apparent from the following detailed description and from the claims.

DESCRIPTION OF DRAWINGS

Like reference numerals will be used to represent like elements.

DETAILED DESCRIPTION

Figure 1:
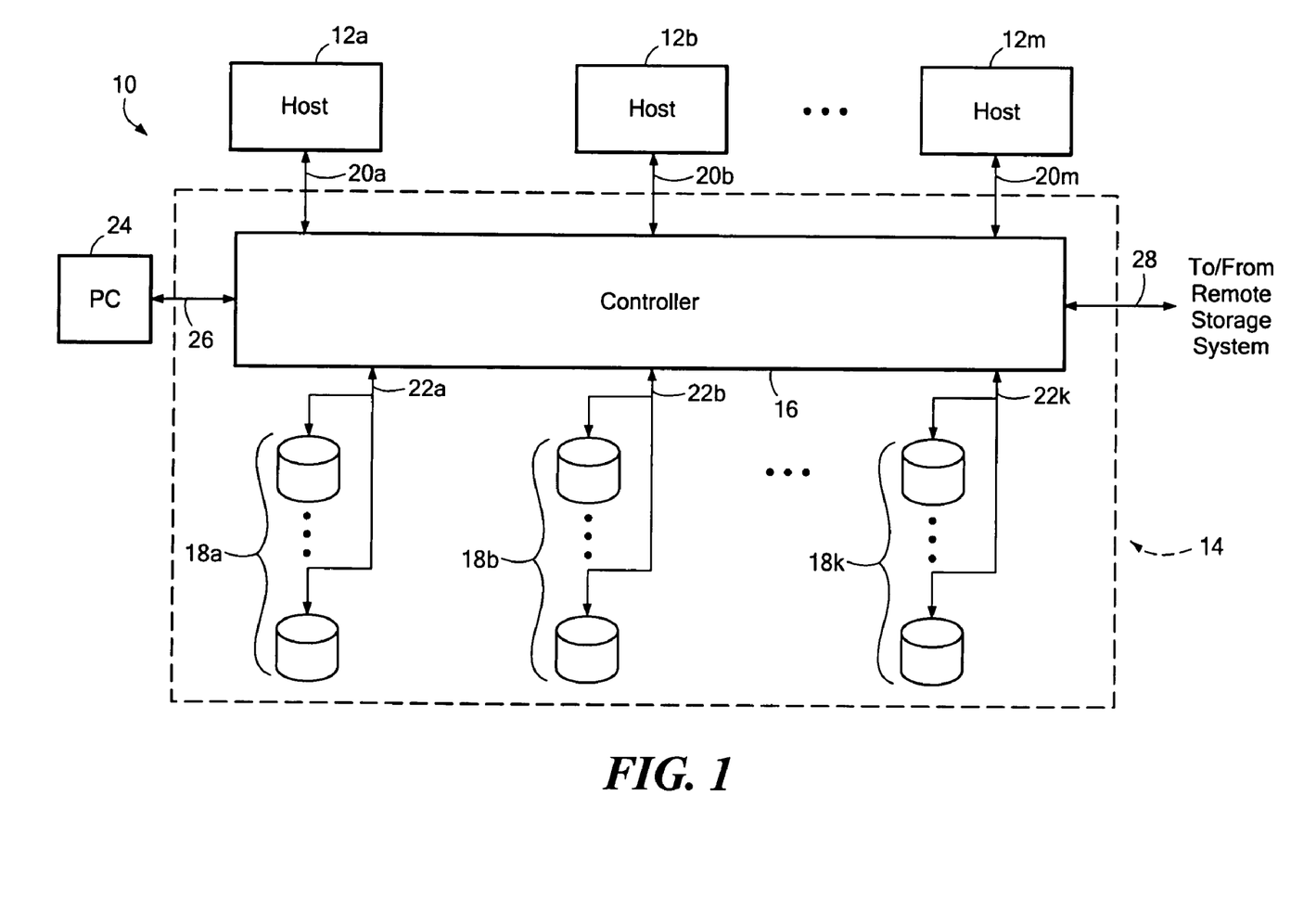
FIG. 1 is block diagram of a data processing system including host computers coupled to a data storage system, which includes storage devices coupled to a storage controller for controlling data transfers between the host computers and storage devices as well as between the data storage system and another, remote data storage system.

Referring to FIG. 1, a data processing system 10 includes host computers 12a, 12b, ..., 12m, connected to a data storage system 14. The data storage system 14 can be, for example, that made by EMC Corporation and known as the Symmetrix data storage system. The data storage system 14 receives data and commands from, and delivers data and responses to, the host computers 12. The data storage system 14 is a mass storage system having a controller 16 coupled to pluralities of physical storage devices shown as disk devices 18a, disk devices 18b, ..., disk devices 18k. Each of the disk devices 18 is logically divided, in accordance with known techniques, into one or more logical volumes.

The controller 16 interconnects the host computers 12 and the disk devices 18. The controller 16 thus receives write commands form the various host computers over buses 20a, 20b, ..., 20m, respectively, for example, connected and operated in accordance with a SCSI protocol, and delivers the data associated with those commands to the appropriate devices 18a, 18b, ..., 18k, over respective connecting buses 22a, 22b, ..., 22k. Buses 22 also operate in accordance with a SCSI protocol. Other protocols, for example, Fibre Channel, could also be used for buses 20, 22. The controller 16 also receives read requests from the host computers 12 over buses 20, and delivers requested data to the host computers 12, either from a cache memory of the controller 16 or, if the data is not available in cache memory, from the disk devices 18.

In a typical configuration, the controller 16 also connects to a console PC 24 through a connecting bus 26. The console PC 24 is used for maintenance and access to the controller 16 and can be employed to set parameters of the controller 16 as is well known in the art.

The controller may be connected to a remote data processing system like the data processing system 10 or a remote data storage system like the data storage system 14 (shown in dashed lines) for data back-up capability by a data link 28. The data link 28 is implemented according to Gigabit Ethernet protocols. Other network protocols can be used as well. The data link 28 enables a remote data storage system to store on its own devices a copy of information stored in the devices 18 of the data storage system 14 in a mirrored manner, as will be described.

Figure 2:
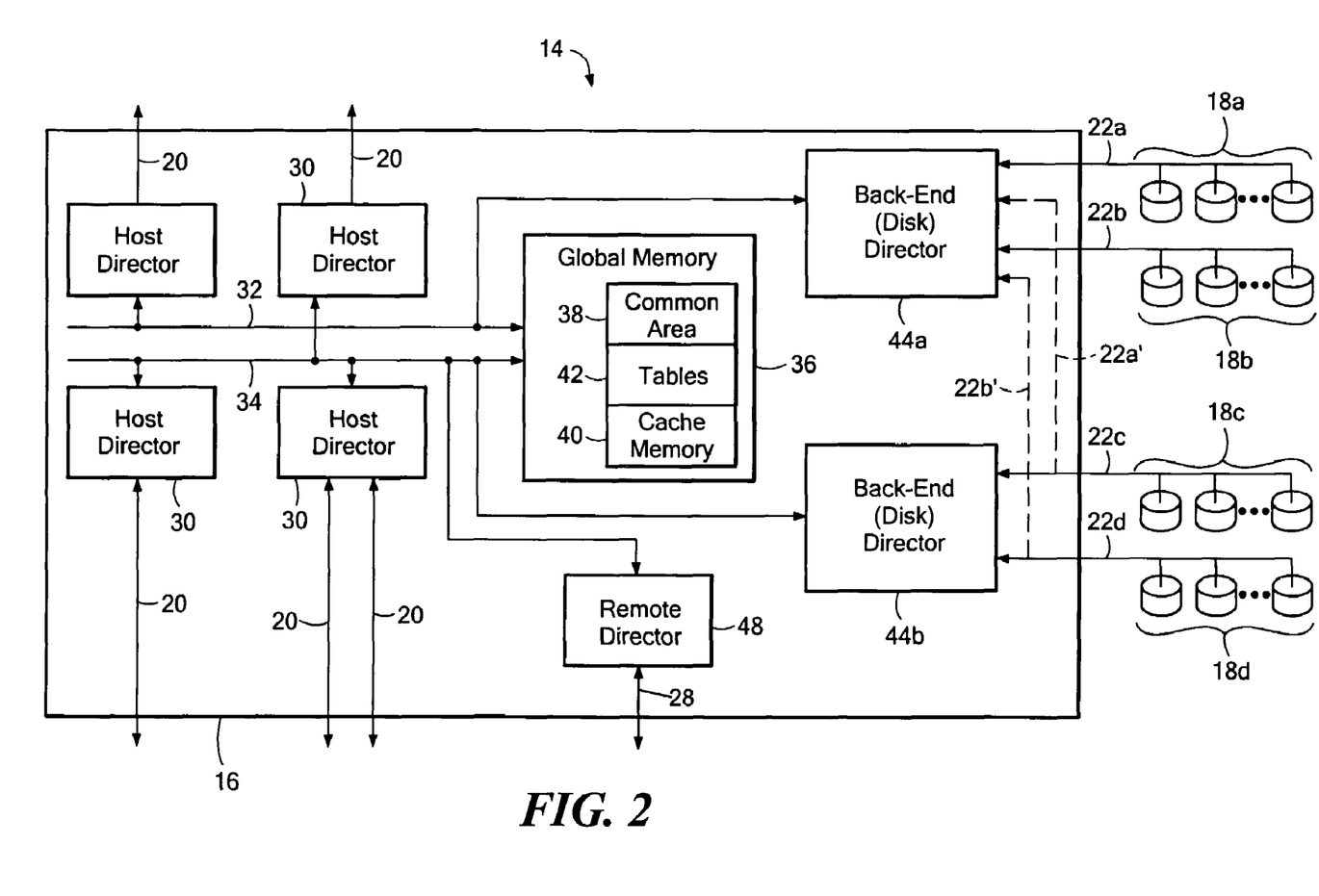
FIG. 2 is a detailed block diagram of the data storage system and its storage controller (shown in FIG. 1), which includes a remote (Remote Data Facility or "RDF") director for managing the exchange of RDF storage traffic between the data storage system and a remote data storage system over an IP network.

In operation, the host computers 12a, 12b, ..., 12m, send, as required by the applications they are running, commands to the data storage system 14 requesting data stored in the logical volumes or providing data to be written to the logical volumes. Referring to FIG. 2, and using the controller in the Symmetrix data storage system as an illustrative example, details of the internal architecture of the data storage system 14 are shown. The communications from the host computer 12 typically connect the host computer 12 to a port of one or more host directors 30 over the SCSI bus lines 20. Each host director, in turn, connects over one or more system buses 32 or 34 to a global memory 36. The global memory 36 is preferably a large memory through which the host director 30 can communicate with the disk devices 18. The global memory includes a common area 38 for supporting communications between the host computers 12 and the disk devices 18, a cache memory 40 for storing data and control data structures, and tables 42 for mapping areas of the disk devices 18 to areas in the cache memory 40.

Also connected to the global memory 36 are back-end (or disk) directors 44, which control the disk devices 18. In the preferred embodiment, the disk directors are installed in the controller 16 in pairs. For simplification, only two disk directors, indicated as disk directors 44a and 44b, are shown. However, it will be understood that additional disk directors may be employed by the system.

Each of the disk directors 44a, 44b supports four bus ports. The disk director 44a connects to two primary buses 22a and 22b, as well as two secondary buses 22a' and 22b'. The buses are implemented as 16-bit wide SCSI buses. As indicated earlier, other bus protocols besides the SCSI protocol may be used. The two secondary buses 22a' and 22b' are added for redundancy. Connected to the primary buses 22a, 22b, are the plurality of disk devices (e.g., disk drive units) 18a and 18b, respectively. The disk director 44b connects to two primary buses 22c and 22d. Connected to the primary buses 22c, 22d are the plurality of disk devices or disk drive units 18c and 18d. Also connected to the primary buses 22c and 22d are the secondary buses 22a' and 22b'. When the primary bus is active, its corresponding secondary bus in inactive, and vice versa. The secondary buses of the disk director 44b have been omitted from the figure for purposes of clarity.

Like the host directors 20, the disk directors 44 are also connected to the global memory 36 via one of the system buses 32, 34. During a write operation, the disk directors 44 read data stored in the global memory 36 by a host director 30 and write that data to the logical volumes for which they are responsible. During a read operation and in response to a read command, the disk directors 44 read data from a logical volume and write that data to global memory for later delivery by the host director to the requesting host computer 12.

As earlier mentioned, the data storage system 14 can be remotely coupled to another data storage system 14 in a mirrored storage configuration, using the data link 28. Still referring to FIG. 2, each data storage system 14 in the mirrored storage configuration includes a remote director 48 to connect to the data link 28 and handle transfers of data over that link. The remote director 48 communicates with the global memory 36 over one of the system buses 32, 34.

Figure 3:
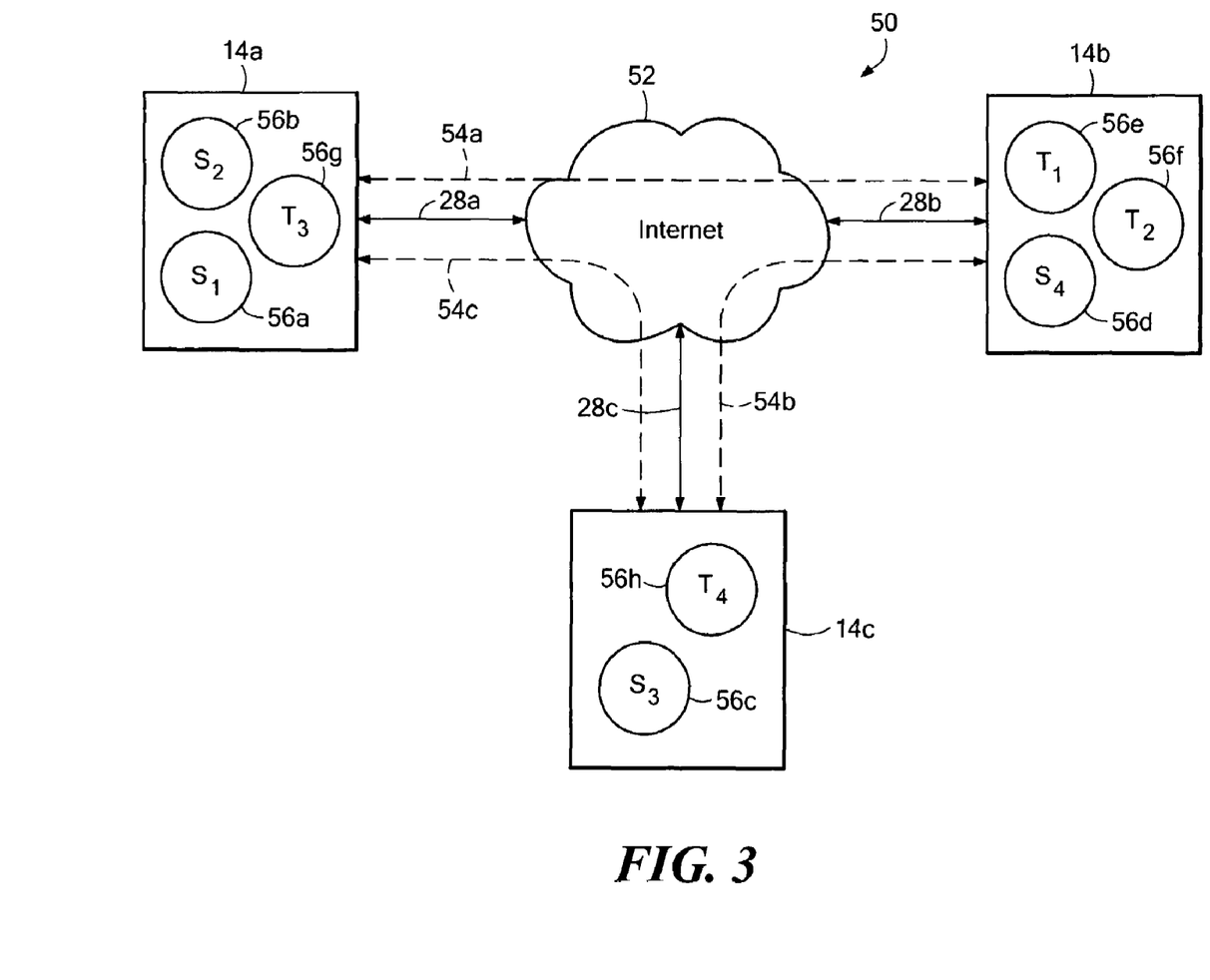
FIG. 3 is a block diagram of a remote, data mirrored arrangement of data storage systems (like the one depicted in FIGS. 1 and 2) that are interconnected by an IP network (shown as the Internet) and are capable of sending storage traffic to each other over the IP network using native connections.

Referring to FIG. 3, a remote data services (e.g., data mirroring) storage configuration 50 includes two or more of the data storage systems 14 (illustrated as three data storage systems 14a, 14b and 14c). The data storage systems 14a, 14b and 14c are directly coupled to an IP network (shown as the Internet 52) by respective data links 28a, 28b and 28c. The data links 28 are implemented as Gigabit Ethernet transmission channels as mentioned earlier, but any suitable transmission medium for supporting TCP/IP traffic may be used. The data links 28, and the IP network 52, are used to support connections for carrying TCP/IP traffic between the units 14. For example, a first connection 54a may be established between the data storage systems 14a and 14b. A second connection 54b may be established between the data storage systems 14b and 14c. A third connection 54c may be established between the data storage systems 14c and 14a. In the system 50, the data storage systems 14 are configured for remote data mirroring capability. More specifically, in the example shown, there are eight device groups, S1, S2, S3, S4, T1, T2, T3, T4, which are indicated by reference numerals 56a, 56b, 56c, 56d, 56e, 56f, 56g, 56h, respectively. Four of the device groups, S1 through S4, are source device groups, and device groups T1 through T4 are target device groups. In the example shown, the data storage systems 14 are configured in the following manner: the data storage system 14a supports device groups S1, S2 and T3; the data storage system 14b supports device groups S4, T1 and T2; and the data storage system 14c supports the device groups S3 and T4. Thus, the devices in the source group S1 are mirrored in the devices in corresponding target device group T1, devices in the source group S2 are mirrored in the devices in corresponding target device group T2, and so forth. Thus, the units use TCP/IP to exchange storage traffic as required by remote data facility services, for example, the data storage systems 14a and 14b establish a connection with each other so that the data storage system 14a can provide a copy of data residing on the source device group S1 to the target device group T1. Thus, the architecture of the remote directors 48 (as will be described) in the each of the data storage systems 14 allows those systems to use the Internet infrastructure for disaster recovery and other remote data services. Although the IP network 52 is shown as the public Internet, it could instead be a private network.

Figure 4:
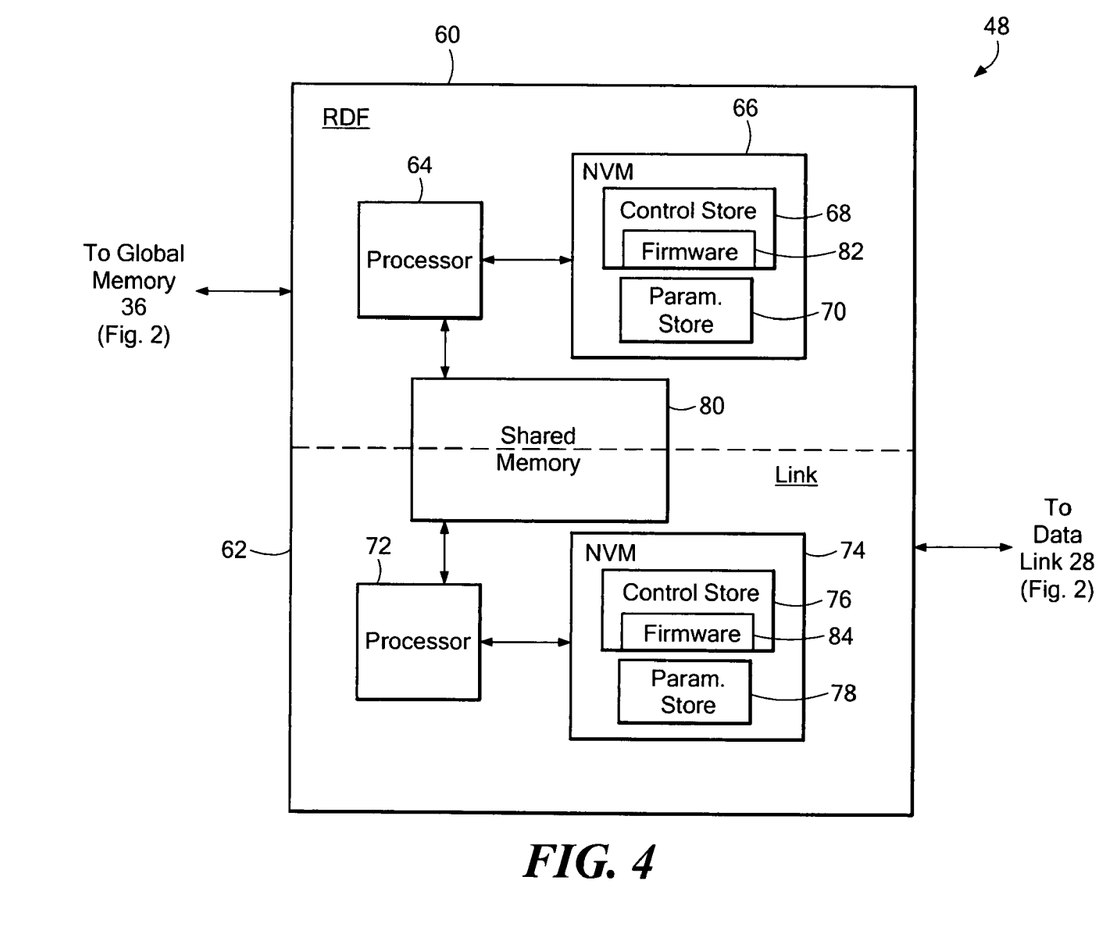
FIG. 4 is a block diagram of a two-processor implementation of the remote director (of FIG. 2) to enable native connections to an IP network.

As shown in FIG. 4, the remote director 48 includes an RDF director 60 and a link director 62. The RDF director 60 includes a processor 64 coupled to a local, nonvolatile memory (NVM) 66. The NVM 66 includes a control store 68 and a parameter store 70. The link director 62 includes a processor 72 coupled to its own, NVM 74, which also includes a control store 76 and a parameter store 78. The directors 60, 62 each have access to a shared memory 80. The processor 64 controls the overall operations of the RDF director 62 and communications with the memories 66 and 80. The control store 68 stores firmware (or microcode) 82 and parameter store stores parameter data, both of which are read each time the data storage system 14 is initialized. The microcode 82 is copied into the control store 68 at initialization for subsequent execution by the processor 64. The processor 72 controls the overall operations of the link director 62 and communications with the memories 74 and 80. The control store 76 stores link firmware (or microcode) 84 and the parameter store 78 stores parameter data, both of which are read each time the data storage system 14 is initialized. The microcode 84 is copied into the control store 76 at initialization for subsequent execution by the processor 72.

Figure 5:
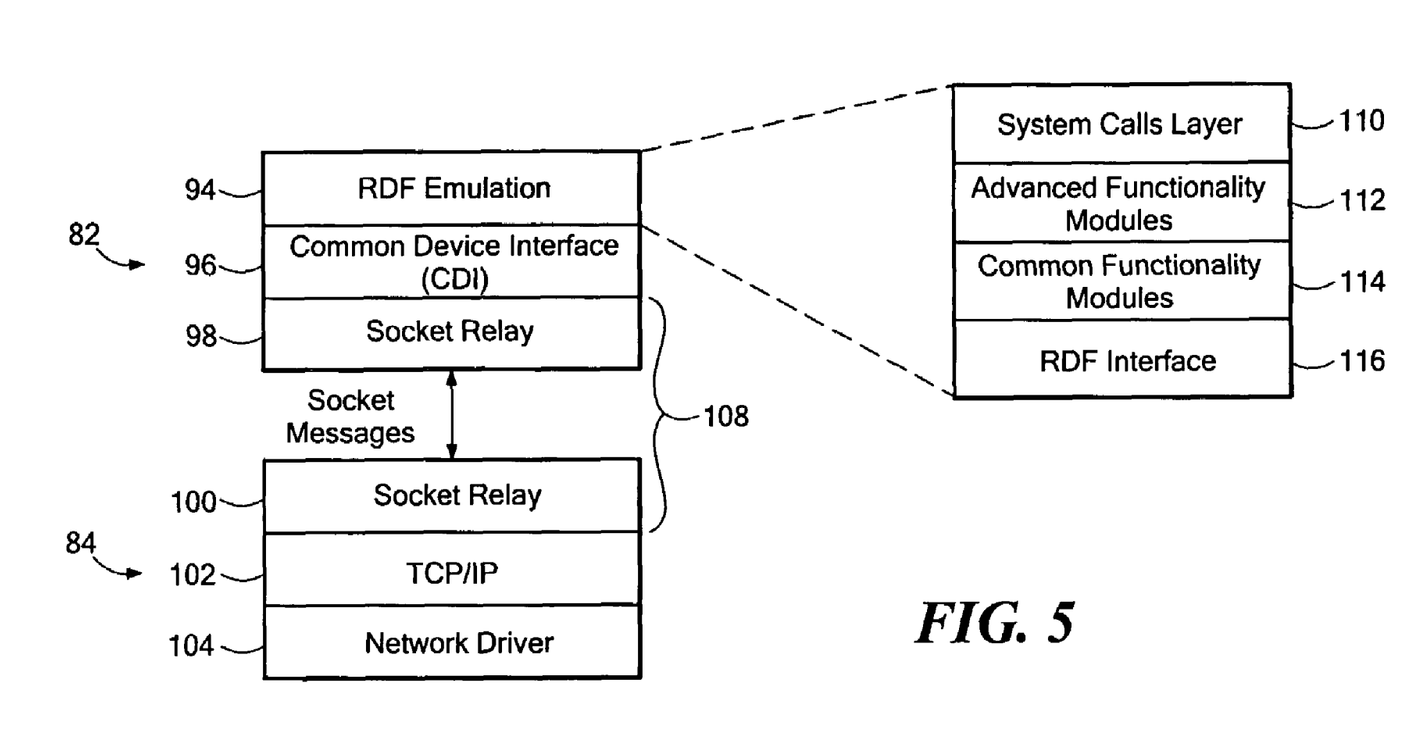
FIG. 5 is a depiction of the software executed by the processors in the remote director.

Referring to FIG. 5, the microcodes 82 and 84 are shown. The RDF director's microcode 82 includes an RDF emulation layer 94, a Common Device Interface 96 and a first socket relay layer 98. The microcode 84, executed by the link processor 72, includes a second socket relay layer 100, a TCP/IP layer 102 and a network driver 104. Collectively, the socket relays 98, 100 represent a socket interface 108, and pass socket messages to each other. Although the interface 108 between the higher-level RDF emulation/CDI layers (which execute on the emulation processor 64) and the TCP/IP protocols of layer 102 (which execute on the link processor 74) is shown as being implemented as a socket interface, other interfaces could be used for communications between the RDF emulation and the TCP/IP protocols software.

The RDF emulation 94 can include the following: a system calls layer 110; advanced functionality modules 112, which may be optional at the director level or even at the data storage system level; common function modules 114, which are provided to each director in the controller 16; and an interface (director application) module. Interface modules exist for each of the different types of directors that are available based on connectivity and/or function, for example, a Remote Data Facility (RDF) interface defines the functionality of the remote director 48, mainframe and Open Systems host interfaces, respectively, define host directors 30, and a back-end interface defines the functionality of the back-end director 44.

The emulation is defined as software that implements both an Upper Level Protocol (ULP), that is, a protocol associated with functionality in one or more of layers 110, 112 and 114 (from FIG. 5), and functions corresponding to the RDF interface 116. Thus, the emulation 94 resides above any physical transport layers and includes software corresponding to the RDF interface 114 as well as software implementing a ULP.

The CDI 96 recognizes that different physical transports have different physical formats, data capacities and access characteristics. Consequently, the CDI 96 accommodates and isolates those physical transport differences so that those portions of the drivers and emulations that interact with each other are generic in nature. The CDI 96 provides for versatility and is intended to support any existing or envisioned transport functionality (or protocol). In addition to abstracting the details of different physical transport protocols, the CDI handles physical data movement (e.g., via a DMA mechanism, as described below) and makes that data movement transparent to emulation software.

The CDI can be viewed as being embodied in an I/O control block (hereinafter, "IOCB") data structure. This IOCB data structure is a generic structure that serves to define a common interface between the emulation 94 and a CDI compliant lower layer (CDI driver) with which the emulation 94 communicates in transferring commands and data. To make a request (containing a ULP command) to a CDI driver, the RDF emulation 94 uses a call, 'CDI IOCTL' that takes as its only parameter a pointer to an IOCB describing the request. During the lifetime of that request and its associated IOCB, the control of the IOCB alternates between the emulation and the CDI driver that has accepted it. The CDI driver has control of the IOCB while an IOCTL call is outstanding. The RDF emulation 94 has control of the IOCB when the call request has been completed. Notification of events, e.g., the completion of an IOCTL call or the arrival of a new ULP command, is signaled by the CDI driver to the emulation by placing corresponding IOCBs on queues referred to herein as event (or completion) queues. Thus, the emulation detects a call request completion status when it determines that the IOCB associated with the call has been placed on an event queue by the CDI driver. By removing the IOCB from the event queue, the emulation gains control of the buffer that had been allocated to that IOCB.

The CDI 96 may be supported in a polled or interrupt driven environment. In a polled environment, the emulation must make periodic calls to a routine that acts as an interrupt service routine in that is gives the driver a chance to look at the physical interface and process any accumulated events. This call must be made frequently to facilitate the timely discovery of new events or the completion of requests. In an interrupt driven environment, interrupts allows events to be processed as they occur.

Further architectural and implementation-specific details of the CDI 96 can be found in co-pending U.S. patent application Ser. No. 09/797,347, filed Mar. 1, 2001, incorporated herein by reference.

Still referring to FIG. 5, below the CDI 96 is the socket interface 100. In the described embodiment, the RDF emulation 94 and the socket interface 100 have knowledge of the CDI format. Thus, the CDI 96 serves to isolate the RDF emulation 94 from the TCP/IP layer.

Implementation-specific details of the TCP/IP layer 102, as well as lower network layers 104, 106 are implemented in known fashion and therefore described no further herein. It will be appreciated that one skilled in the art would be able to implement the required link processor software (as well as any special hardware assists, e.g., DMA, not shown) necessary to transfer and receive packets over a Gigabit Ethernet data link using TCP/IP.

Although FIG. 5 shows the link processor firmware 84 as including network (e.g., Gigabit Ethernet) driver and hardware interface software (layers 104, 106), it will be appreciated that one or both of these layers could be implemented in a separate, commercially available Gigabit MAC device or chipset.

Figure 6:
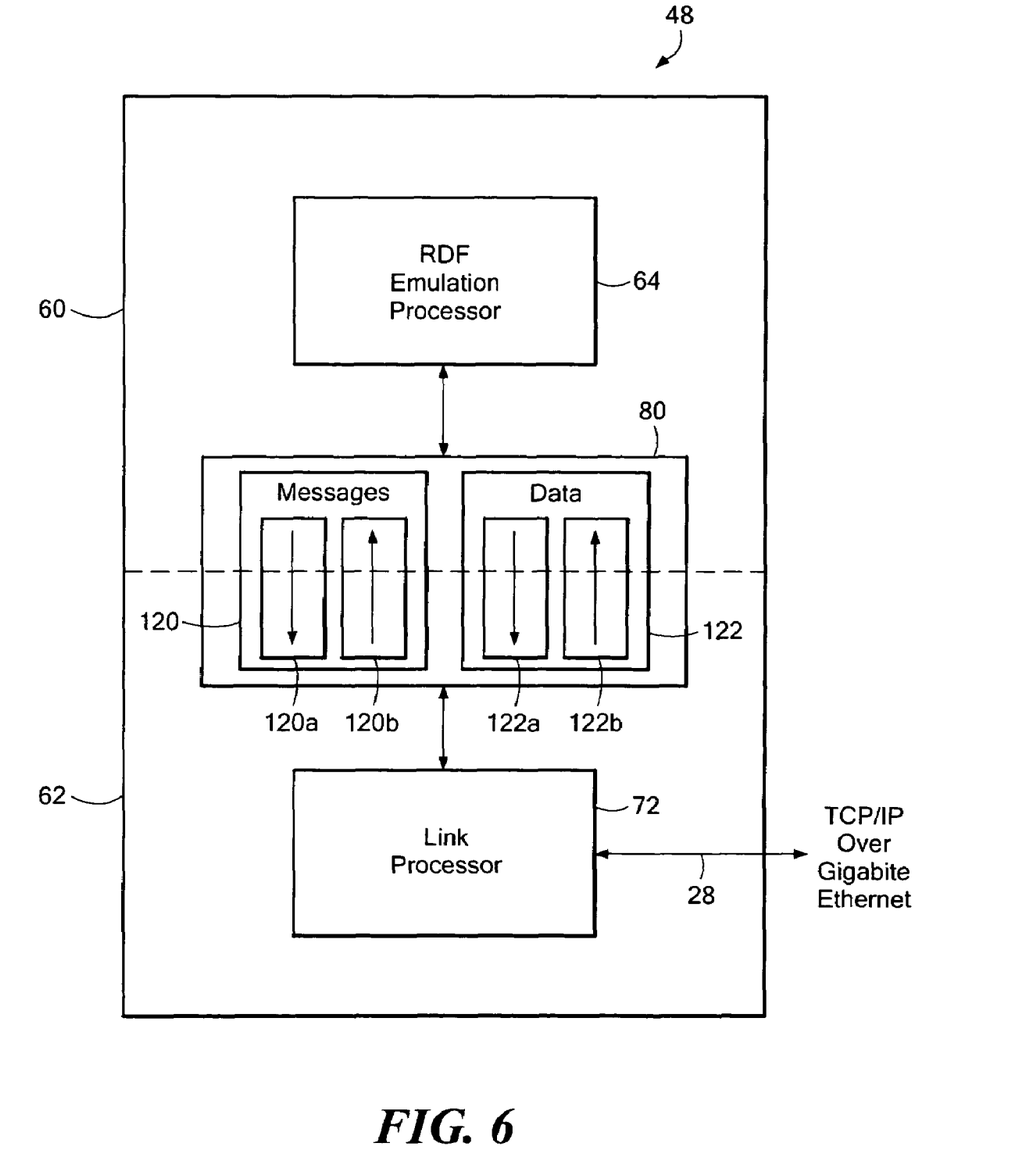
FIG. 6 is another block diagram of the remote director that shows details of a shared memory implementation for exchanging socket interface messages across processor boundaries.

Referring to FIG. 6, a conceptual depiction of the interface 48 that shows some details of the shared memory 80 used for passing socket messages between the emulation processor 64 and the link processor 72 is shown. The shared memory 80 includes data structures for messages 120 and data 122, respectively. The messages are message related to establishing and tearing down individual TCP/IP connections. The data is the data to be encapsulated in a TCP/IP protocol data unit and passed down the protocol stack for processing and transmission over the Gigabit Ethernet data link, or data that was received over the link and decapsulated/processed as it is passed up the protocol stack in known fashion. The message data structures include outgoing and inbound data structures, 120a and 120b, for outgoing and inbound messages, respectively. Likewise, the data structures for managing transfer of data also include an outgoing data structure 122a and an inbound data structure 122b. All of the structures 120a, 120b 122a, 122b may be implemented as the same type of data structure, for example, circular rings.

It will be appreciated that the director 48 has been implemented as a two-processor architecture for performance reasons, that is, to off load the processing intensive TCP/IP operations from the processor that handles the RDF interface to the link processor. However, a single processor solution is also contemplated.

In addition, while the embodiment described above passes socket messages across the two-processor boundary, it may be possible to split the CDI between processors so that the messages that are passed between processors are CDI messages instead of socket messages. Such an implementation would require that the TCP/IP layer have knowledge of and be coded to conform to the CDI. Further, the present invention can be stored on a computer readable medium, e.g., RAM memory, magnetic or optical drive or diskette and the like.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A data storage system comprising:
    a storage device; and
    a controller coupled to the storage device and configured to transfer storage traffic between the data storage system and a remote data storage system to which the data storage system is coupled by an IP network in accordance with a remote data service application, the controller comprising two processors including a first processor and a second processor, the controller further including an interface between the remote data service application and a TCP/IP protocols software layer, the interface usable to form a connection to the IP network, wherein the storage traffic is transferred between the data storage system and the remote data storage system over the IP network using the connection to the IP network, wherein the interface is split across the two processors, with a first interface portion residing on the first processor and a second interface portion residing on the second processor.

2. The data storage system of claim 1, wherein the IP network is the Internet.

3. The data storage system of claim 1, wherein the IP network is a private network.

4. The data storage system of claim 1, wherein the interface comprises a socket interface to interface an operation of the remote data service application to the TCP/IP protocols software layer.

5. The data storage system of claim 4, wherein the connection comprises TCP/IP over Gigabit Ethernet.

6. The data storage system of claim 4, wherein the socket interface is usable to create a socket from which the connection to the IP network is formed.

7. The data storage system of claim 1, wherein the first interface portion and the remote data service application conform to a common interface.

8. A computer program product residing on a computer-readable medium for operating a controller of a data storage system in a remote data mirroring arrangement of data storage systems, the computer program product comprising instructions causing a computer to:
    run a remote data service application for the transfer of storage traffic between the data storage system and a remote data storage system to which the data storage system is coupled by an IP network;
    use an interface between the remote data service application and a TCP/IP protocols software layer to form a connection to the IP network, wherein the interface is split across two processors of the controller, with a first interface portion residing on a first processor and a second interface portion residing on a second processor; and
    transfer the storage traffic between the data storage system and the remote data storage system over the IP network using the connection to the IP network.

9. The computer program product of claim 8, wherein the IP network is the Internet.

10. The computer program product of claim 8, wherein the IP network is a private network.

11. The computer program product of claim 8, wherein the interface comprises a socket interface to interface an operation of the remote data service application to the TCP/IP protocols software layer.

12. The computer program product of claim 11, wherein the socket interface is usable to create a socket from which the connection to the IP network is formed.

13. The computer program product of claim 8, wherein the connection comprises TCP/IP over Gigabit Ethernet.

14. The computer program product of claim 8, wherein the first interface portion and the remote data service application conform to a common interface.

15. The computer program product of claim 8, wherein the first processor comprises a Remote Data Facility (RDF) emulation processor to execute first processor firmware comprising the remote data service application and the first interface portion, and wherein the second processor comprises a link processor to execute second processor firmware comprising the second interface portion, the TCP/IP protocols software layer and a network driver.

16. A controller for a data storage system adapted to be in a remote mirroring arrangement with a remote data storage system, the controller comprising:
    two processors including a first processor and a second processor;
    a remote data service application to run on the controller for the transfer of storage traffic between the data storage system and the remote data storage system; and
    an interface between the remote data service application and a TCP/IP protocols software layer, the interface usable to form a connection to the IP network used to transfer storage traffic between the data storage system and the remote data storage system, wherein the interface is split across the two processors, with a first interface portion residing on the first processor and a second interface portion residing on the second processor.

17. The controller of claim 16, wherein the connection comprises TCP/IP over Gigabit Ethernet.

18. The controller of claim 16, wherein the first processor comprises a Remote Data Facility (RDF) emulation processor to execute first processor firmware comprising the remote data service application and the first interface portion, and wherein the second processor comprises a link processor to execute second processor firmware comprising the second interface portion, the TCP/IP protocols software layer and a network driver.

* * * * *

UNITED STATES PATENT AND TRADEMARK OFFICE
CERTIFICATE OF CORRECTION

PATENT NO. : 7,430,589 B2 Page 1 of 1
APPLICATION NO. : 11/224408
DATED : September 30, 2008
INVENTOR(S) : Alex Veprinsky et al.

It is certified that error appears in the above-identified patent and that said Letters Patent is hereby corrected as shown below:

Col. 1, line 23, delete ". Once" and replace with -- . One --.

Col. 2, line 41, delete "is block" and replace with -- is a block --.

Col. 3, line 20, delete "form" and replace with -- from --.

Col. 4, line 19, delete "in" and replace with -- is --.

Col. 5, line 10, delete "in the each" and replace with -- in each --.

Col. 5, line 25-26, delete "and parameter" and replace with -- and the parameter --.

Col. 6, line 42, delete "is" and replace with -- it --.

Col. 6, line 46, delete "allows" and replace with -- allow --.

Col. 6, line 59, delete "therefore described" and replace with

-- therefore are described --.

Signed and Sealed this

Second Day of December, 2008

JON W. DUDAS
*Director of the United States Patent and Trademark Office*